United States Patent
Dawson et al.

(10) Patent No.: US 6,961,811 B2
(45) Date of Patent: Nov. 1, 2005

(54) APPARATUS AND METHOD TO MAINTAIN INFORMATION BY ASSIGNING ONE OR MORE STORAGE ATTRIBUTES TO EACH OF A PLURALITY OF LOGICAL VOLUMES

(75) Inventors: Erika M. Dawson, Tucson, AZ (US); Jonathan W. Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 10/230,513

(22) Filed: Aug. 29, 2002

(65) Prior Publication Data

US 2004/0044843 A1 Mar. 4, 2004

(51) Int. Cl.[7] ............................................. G06F 12/00
(52) U.S. Cl. ........................ 711/112; 711/111; 711/114; 711/203; 707/10; 707/102
(58) Field of Search ............................ 711/111, 112.1; 707/10, 102

(56) References Cited

U.S. PATENT DOCUMENTS

| | | | | |
|---|---|---|---|---|
| 4,755,928 A | | 7/1988 | Johnson et al. ............. | 364/200 |
| 5,940,849 A | * | 8/1999 | Koyama ....................... | 711/4 |
| 6,202,124 B1 | | 3/2001 | Kern et al. .................. | 711/112 |
| 6,247,103 B1 | | 6/2001 | Kern et al. .................. | 711/162 |
| 6,553,387 B1 | * | 4/2003 | Cabrera et al. ............. | 707/200 |
| 6,662,268 B1 | * | 12/2003 | McBrearty et al. ......... | 711/114 |
| 6,718,436 B2 | * | 4/2004 | Kim et al. ................... | 711/114 |
| 6,728,831 B1 | * | 4/2004 | Bridge ........................ | 711/112 |
| 2002/0059263 A1 | * | 5/2002 | Shima et al. ............... | 707/100 |

OTHER PUBLICATIONS

Erner et al., "A Model of File Server Performance for a Heterogenous . . .", 1986, pgs. 338–347.
Menon, "A Performance Comparison of RAID–5 and Log-–Structured Arrays", 1995, pgs. 167–178.
Savage, "Storage Server as Physical Box", 1988, pgs. 14–20.

* cited by examiner

Primary Examiner—Doanld Sparks
Assistant Examiner—Ngoc Dinh
(74) Attorney, Agent, or Firm—Dale F. Regelman

(57) ABSTRACT

A method to maintain information by assigning one or more storage attributes to each of a plurality of logical volumes. The method writes a first portion of a dataset to a first logical volume. The method assigns one or more storage attributes to that first logical volume. When the logical end of volume for the first logical volume is approaching, Applicants' method mounts a second logical volume, and continues writing the dataset to that second logical volume. The method assigns the same one or more storage attributes to the second logical volume.

27 Claims, 6 Drawing Sheets

APPARATUS AND METHOD TO MAINTAIN INFORMATION BY ASSIGNING ONE OR MORE STORAGE ATTRIBUTES TO EACH OF A PLURALITY OF LOGICAL VOLUMES

FIELD OF THE INVENTION

Applicant's invention relates to an apparatus and method to maintain information by assigning one or more storage attributes to each of a plurality of logical volumes. In certain embodiments, that plurality of logical volumes is maintained in a virtual tape system.

BACKGROUND OF THE INVENTION

In hierarchical computer storage systems, intensively used and fast storage are paired with arrays of slower and less frequently accessed data devices. One example of high-speed, expensive memory is a direct access storage device file buffer (DASD). Slower storage devices include tape drives and disk drive arrays, which are less expensive than a DASD.

One such hierarchical storage system is a virtual tape storage system. Such a virtual tape storage system may include, for example, one or more virtual tape servers ("VTS") in combination with one or more data storage and retrieval systems, such as the IBM TotalStorage® 3494 Enterprise Tape Library. During operation, the virtual tape storage system is writing data from a host to the numerous data storage devices disposed in the one or more data storage and retrieval systems.

Automated data storage and retrieval systems are known for providing cost effective access to large quantities of stored media. Generally, a data storage and retrieval system includes a large number of storage slots on which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, and the like.

One (or more) accessors typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

SUMMARY OF THE INVENTION

Applicants' invention includes a method and apparatus to maintain information by assigning one or more storage attributes to each of a plurality of logical volumes. Applicants' method forms a dataset and writes a first portion of that dataset to a first logical volume. Applicants' method assigns one or more storage attributes to that first logical volume. Applicants' method further includes writing a second portion of the first dataset to a second logical volume, and assigning the same one or more storage attributes to that second logical volume.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in a virtual tape server in combination with an automated data storage and retrieval subsystem for use in a data processing environment. The following description of Applicant's apparatus and method is not meant, however, to limit Applicant's invention to either data storage and retrieval systems, or to data processing applications, as the invention herein can be applied to data storage in general.

Figure 3:
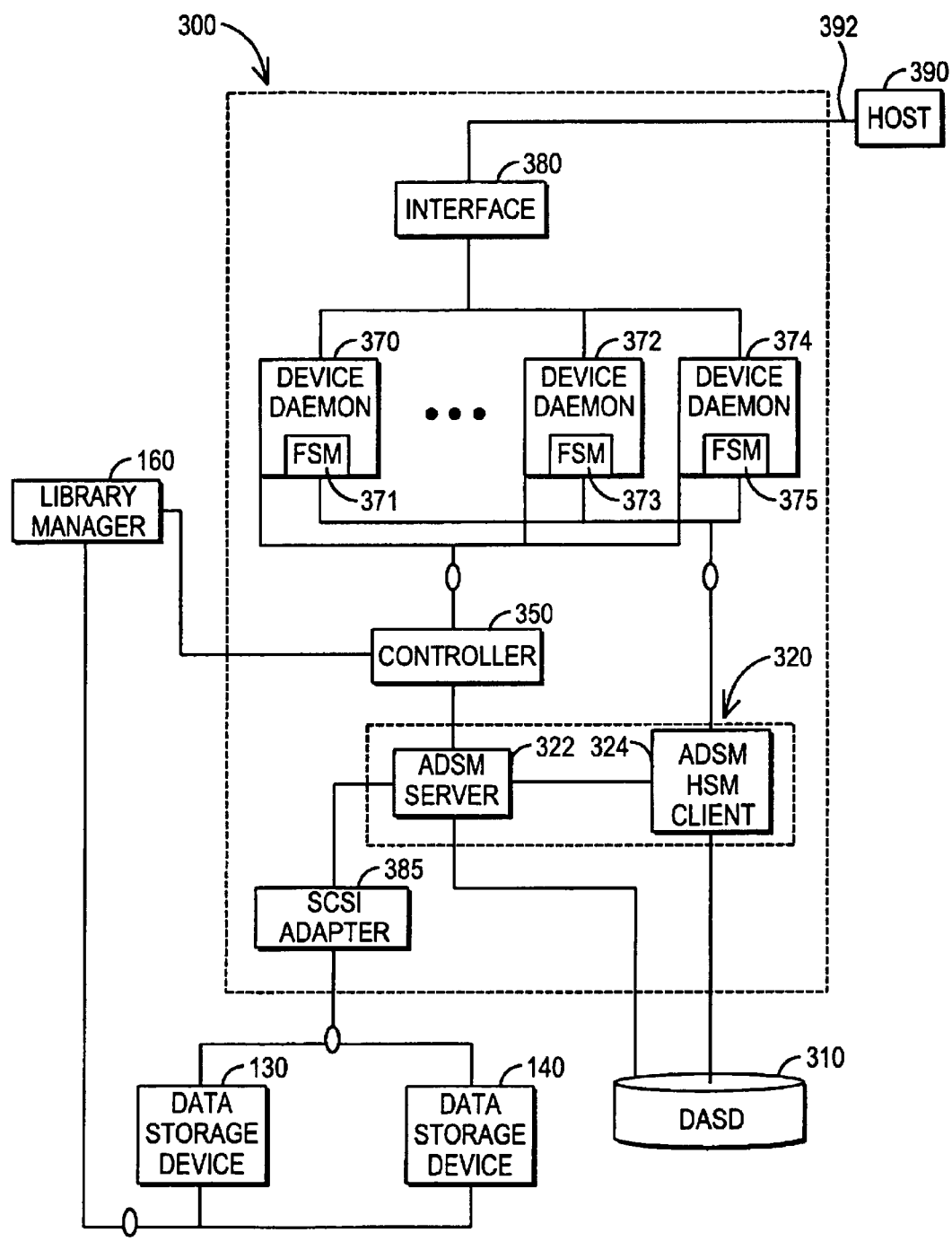
FIG. 3 is a block diagram showing the components of Applicants' virtual tape system.

FIG. 3 illustrates the hardware and software environment in which preferred embodiments of the present invention are implemented. Virtual tape server (VTS) 300 is pictured, operatively coupled to a host computer 390. In certain embodiments, host computer 390 comprises a single computer. In alternative embodiments, host computer 390 comprises one or more mainframe computers, one or more work stations, one or more personal computers, combinations thereof, and the like.

Host computer 390 communicates with VTS 300 via communication link 392 with a host-to-data interface 380 disposed within the virtual tape server 300. Communication link 392 comprises a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof. In certain embodiments, the host-to-data interface 380 comprises an IBM Enterprise Systems Connection (ESCON) and communication link 392 comprises a fiber optic local area network used to link mainframes to disk drives or other mainframes.

VTS 300 also communicates with direct access storage device (DASD) 310, a plurality of data storage devices 130/140 and library manager 160. Data storage devices 130 and 140, and library manager 160, are disposed within one or more data storage and retrieval systems, such as data storage and retrieval systems 100 (FIG. 1)/200 (FIG. 2). In certain embodiments, DASD 310 is integral with host 390. In certain embodiments, DASD 310 is integral with VTS 300. In certain embodiments, DASD 310 is integral with a data storage and retrieval system. In certain embodiments, DASD 310 is external to host 390, VTS 300, and the one or more data storage and retrieval systems in communication with VTS 300. In the embodiment of FIG. 3, library manager 160 communicates with data storage devices 130 and 140. In alternative embodiments, library manager 160 does not directly communicate with data storage devices 130/140.

VTS 300 further includes storage manager 320, such as the IBM Adstar® Distributed Storage Manager. Storage manager 320 controls the movement of data from DASD 310 to information storage media mounted in data storage devices 130 and 140. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 130 and 140 via ADSM server 322 and SCSI adapter 385.

VTS 300 further includes autonomic controller 350. Autonomic controller 350 controls the operations of DASD 310 through the hierarchical storage manager (HSM) client 324, and the transfer of data between DASD 310 and data storage devices 130 and 140. Library manager 160 communicates with autonomic controller 350.

From the host computer 390 perspective, device daemons 370, 372, and 374 appear to comprise multiple data storage devices attached to the host-to-data interface 380. Information is communicated between DASD 310 and host 390 via storage manager 320 and one or more of device daemons 370, 372, and 374.

Host computer 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 includes a storage management program 394 (not shown in FIG. 3). The storage management program 394 in the host computer 390 may include the functionality of storage management type programs known in the art that manage the transfer of data to a data storage and retrieval system, such as the IBM DFSMS implemented in the IBM MVS operating system.

The IBM DFSMS software is described in "z/OS V1R3 DFSMS Introduction," IBM document no. SC26-7397-01, which document is incorporated herein by reference in its entirety. Storage management program 394 may include known storage management program functions, such as recall and migration. The storage management program 394 may be implemented within the operating system of the host computer 390 or as a separate, installed application program. Alternatively, storage management program 394 may include device drivers, backup software, and the like.

Figure 1:
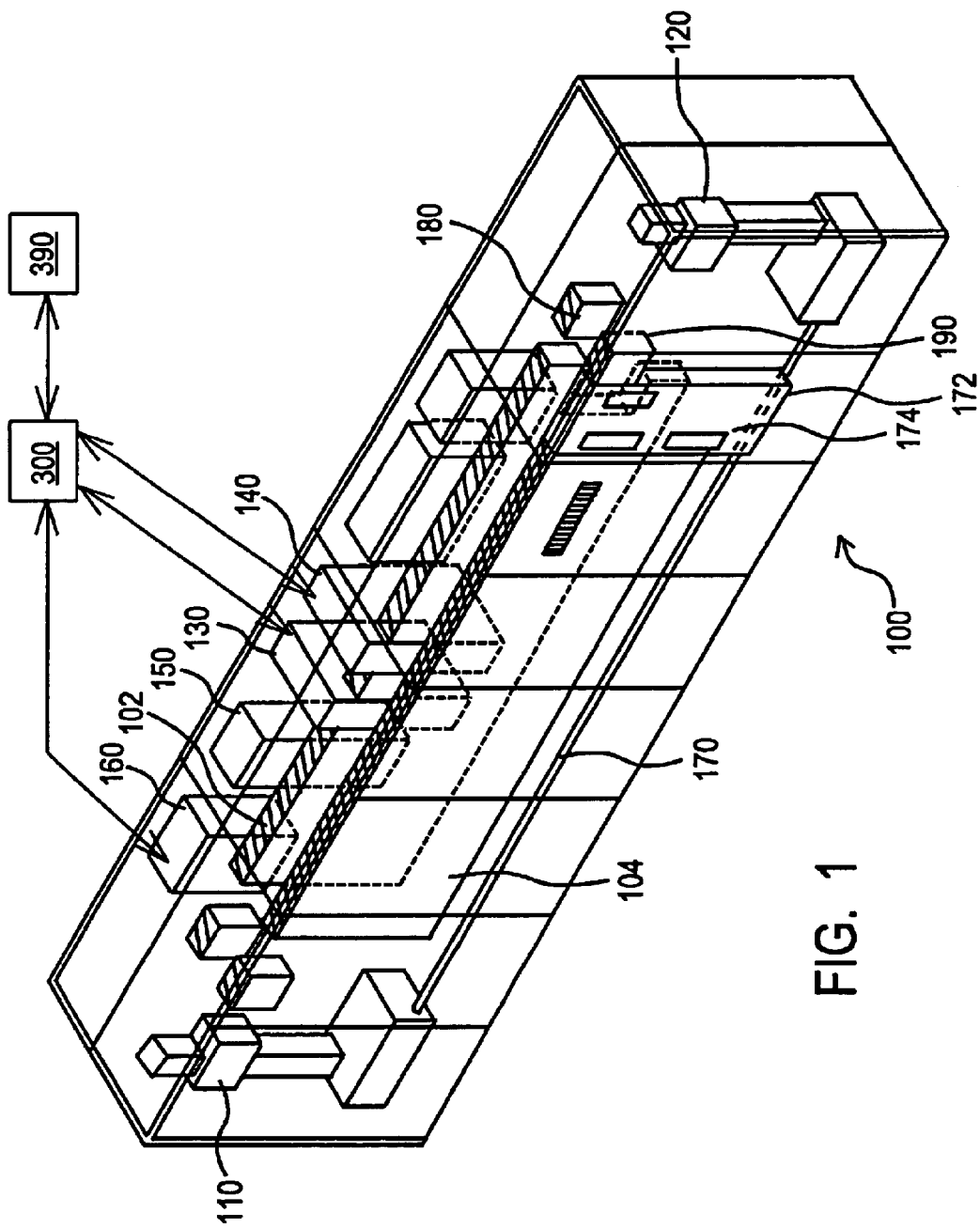
FIG. 1 is a perspective view of a first embodiment of Applicant's data storage and retrieval system.
Figure 2:
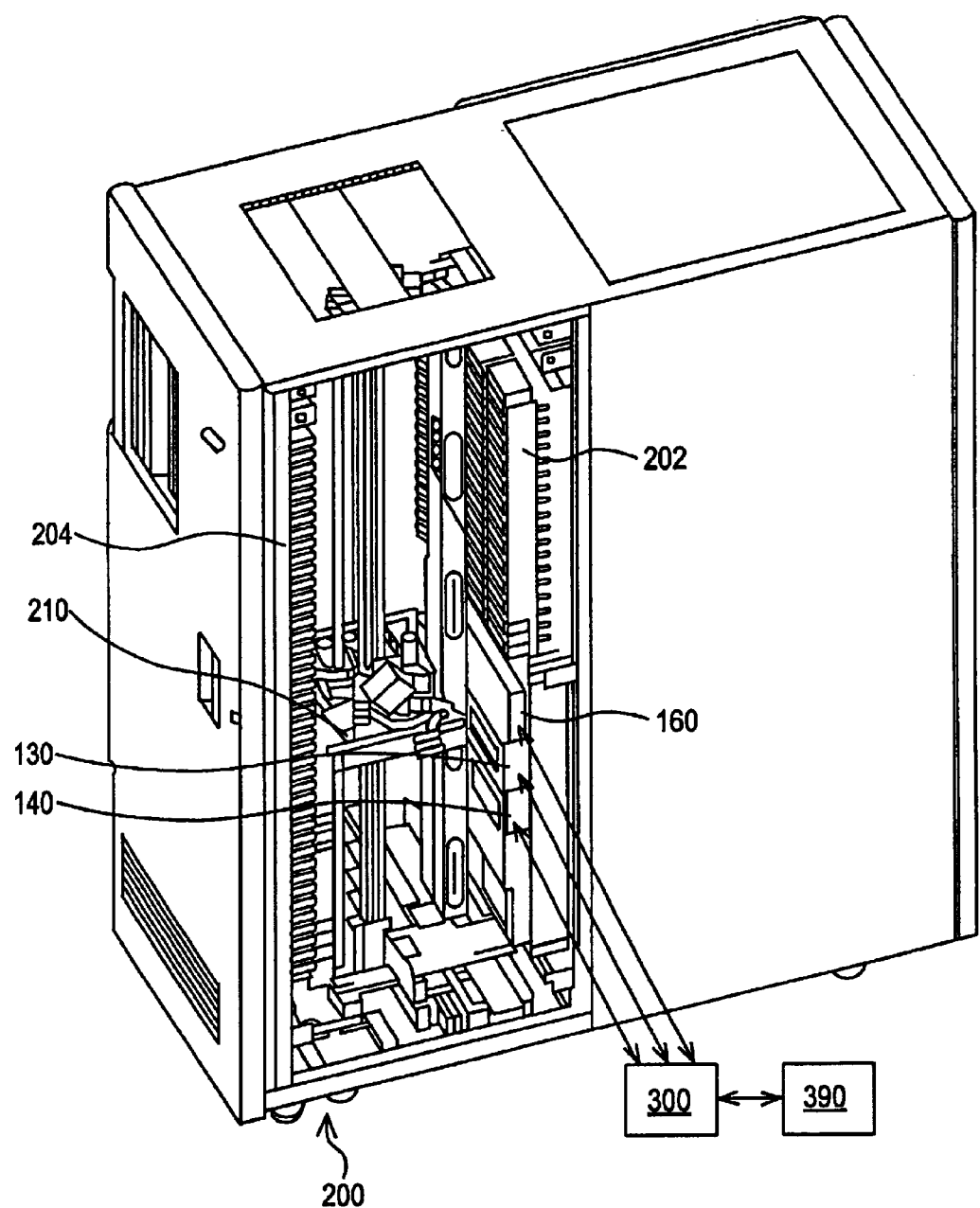
FIG. 2 is a perspective view of a second embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicant's automated data storage and retrieval system includes one or more accessors, such as accessors 110 and 120. An accessor is a robotic device which accesses portable data storage media from first storage wall 102 or second storage wall 104, transports that accessed media to data storage devices 130/140 for reading and/or writing data thereon, and returns the media to a proper storage slot. In certain embodiments, data storage devices 130 (FIGS. 1, 2, 3) and 140 (FIGS. 1, 2, 3) comprise IBM TotalStorage® 3590 tape drives and the portable information storage media comprise magnetic tapes housed in IBM TotalStorage® 3590 tape cartridges.

Device 160 comprises a library manager. In certain of these embodiments, library controller 160 is integral with a computer. Operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage media. System 200 includes two or more data storage devices, such as devices 130 and 140. Data storage device 130/140 each comprise a floppy disk drive, an optical disk drive, a magnetic tape drive, an electronic media drive, and the like. System 200 further includes controller 160. System 200 further includes operator control panel 150 (not shown in FIG. 2).

System 200 further includes one or a plurality of portable data storage cartridges removeably disposed in one or more slots in storage walls 202/204. Each such cartridge contains a data storage medium internally disposed therein. Such data storage media includes optical media, magnetic media, tape media, electronic media, and combinations thereof.

System 200 also includes at least one robotic accessor 210 for transporting a designated portable data storage medium between a storage slot disposed in first wall 202 or second wall 204 and data storage device 130/140.

Figure 4:
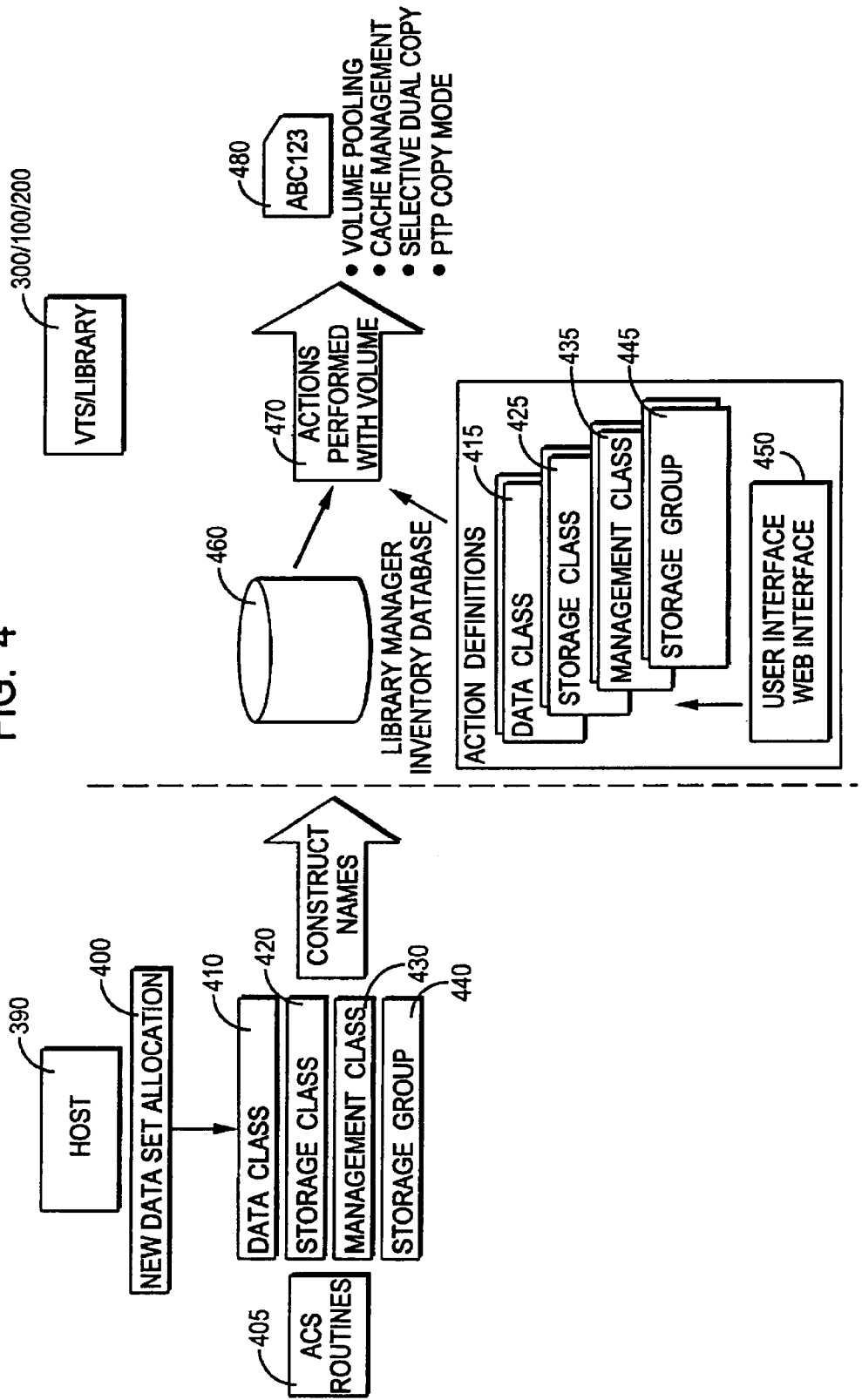
FIG. 4 is a block diagram showing passage of up to four storage construct names from a host computer to Applicants' virtual tape system.

FIG. 4 provides a graphical overview of Applicants' method to maintain information by assigning one or more storage construct names to a new logical volume and assigning one or more storage attributes to that logical volume using those one or more storage construct names. Host computer 390 creates a new dataset 400. Host 390 includes a set of Automatic Class Selection ("ACS") routines which establish the data management policies for the new dataset, for one or more virtual volumes comprising that dataset, for writing those one or more virtual volumes to one or more physical volumes, and for management of those one or more volumes.

These ACS routines determine which information storage policies are assigned to each logical volume maintained by that host computer. These information policies include one or more data class policies 410, one or more storage class policies 420, one or more management class policies 430, and one or more storage group policies 440.

Data class storage policies include, for example, which recording format to use when writing physical volumes, which media cartridge to use, and the like. Storage class storage policies include, for example, whether to give the virtual volume preference to be removed or maintained on a DASD, such as DASD 310 (FIG. 3). Management class storage policies include, for example, whether a copy of the logical volume should be made immediately or whether to defer making that copy, selecting one or more information storage media to use when writing volumes, allocating a secondary stacked volume pool, and the like. Storage group storage policies include, for example, specifying a primary stacked volume pool for the logical volume, and the like.

After an ACS routine establishes a certain storage management policy for a logical volume, that ACS routine then assigns a storage construct name which indicates the selected storage management policy. In certain embodiments, each such storage construct name comprises an 8 byte designator.

Host computer 390 (FIGS. 1, 2, 3, 4) comprises between zero and four ACS routines. In embodiments wherein host 390 includes four ACS routines, for example, host 390 may assign between zero and four storage construct names for new dataset 400. These zero to four storage construct names are passed by host 390 with new dataset 400 to an interconnected virtual tape system. Such an interconnected virtual tape system includes one or more virtual tape servers, such as VTS 300, and one or more data storage and retrieval systems, such as systems 100/200.

The virtual tape system includes a library manager, such a library manager 160 (FIGS. 1, 2). That library manager includes a library inventory 460. Library inventory 460 comprises a database. That inventory database 460 includes fields indicating the storage management policies selected for each virtual volume maintained on that virtual tape system. Thus, library database 460 includes a data class attribute field, a storage class attribute field, a management class attribute field, and a storage group attribute field.

Storage actions associated with each storage construct name are defined for a virtual tape system using an operator input station, such as operator input station 150 (FIG. 1), disposed in that virtual tape system. In certain embodiments, the operator input station is integral with the virtual tape server. In certain embodiments, the operator input station is integral with a data storage and retrieval system. In certain embodiments, the operator input station is remote from both the virtual tape server and the data storage and retrieval system. In these remote operator input station embodiments, operator input station 150 communicates with the virtual tape system using a serial interconnection, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, a TCP/IP interconnection, combinations thereof, and the like.

When Applicants' virtual tape system receives a mount command from the host to write a new first dataset to one or more logical volumes, that mount command includes the storage construct names and an empty clone volser field. A first logical volume is mounted, an identifier is assigned to that logical volume, and the virtual tape system writes the dataset to that first logical volume. The storage construct names assigned to the dataset are stored in library inventory 460 as storage attributes for that first logical volume. In certain embodiments, the identifier assigned to the logical volume comprises a volser.

If the logical end of volume ("LEOV") of the first logical volume approaches while writing the dataset, a first portion of the dataset is written to the first logical volume, and a second mount command issues where that second mount command does not include any storage construct names. Rather, the second mount command includes a clone volser field comprising the identifier. A second logical volume is mounted, the identifier is assigned to that second logical volume, and a second portion of the dataset is written to the second logical volume.

Figure 5:
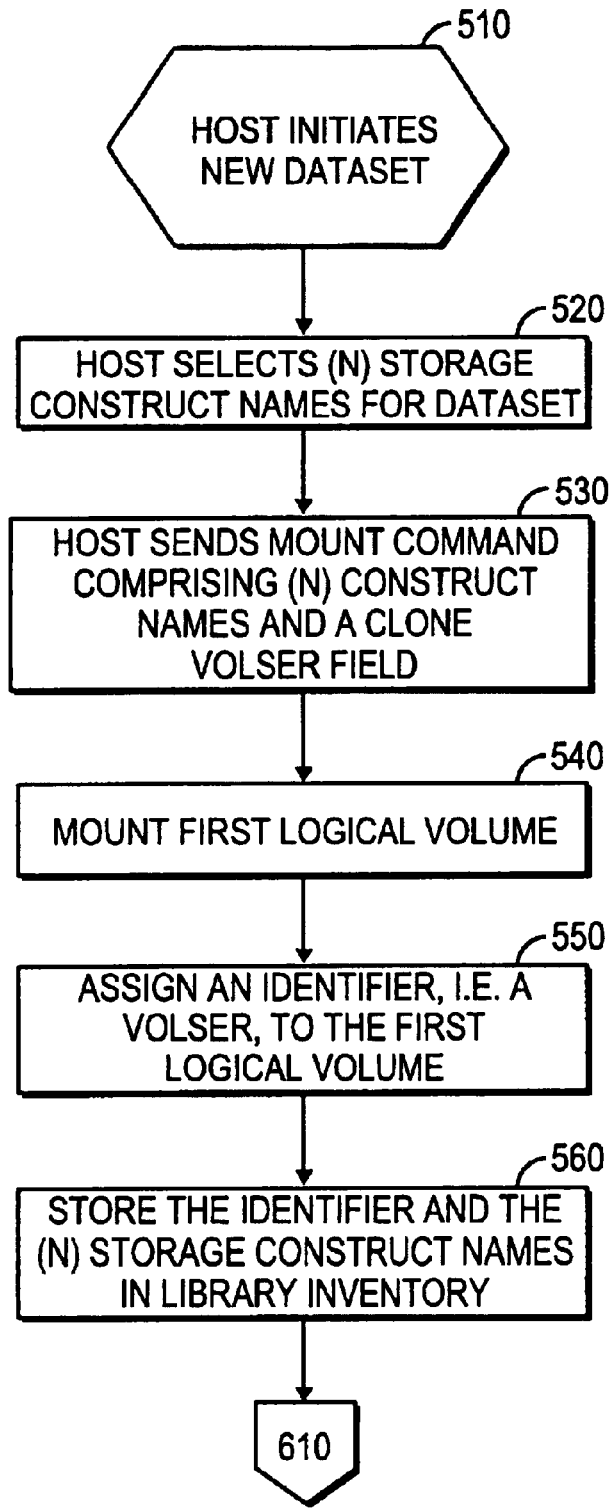
FIG. 5 is a flow chart summarizing certain steps in Applicants' method.

FIG. 5 summarizes the initial steps in Applicants' method. Referring now to FIG. 5, in step 510 a host computer, such as host computer 390 (FIG. 3), forms a new dataset, such as dataset 400 (FIG. 4). In step 520, Applicants' method selects (N) storage construct names for the dataset of step 510. In certain embodiments, the host computer assigns the (N) construct names. In certain embodiments, (N) is zero. In alternative embodiments, (N) is selected from the group consisting of 1, 2, 3, and 4. In certain embodiments, step 520 further includes using one or more automatic class selection routines to assign the (N) construct names.

In step 530, Applicants' method issues a mount command to the virtual tape system to mount a first logical volume. The mount command of step 530 includes the (N) construct names and a clone volser field. In certain embodiments, the clone volser field comprises a 6 byte field. The mount command of step 530 includes an empty clone volser field. In certain embodiments, step 530 includes issuing a Perform Library Function—Universal Mount Command by the host computer to the virtual tape system. Applicants' method transitions from step 530 to step 540 wherein Applicants' method mounts a first logical volume.

Applicants' method transitions from step 540 to step 550 wherein Applicants' method assigns an identifier to the first logical volume. In certain embodiments, the host computer assigns the identifier., In certain embodiments, the virtual tape system assigns the identifier. In certain embodiments, the identifier comprises a volume serial number, i.e. a volser.

Applicants' method transitions from step 550 to step 560 wherein the identifier of step 550, and the (N) storage construct names of step 520 are stored. In certain embodiments, Applicants' virtual tape system includes a library inventory, such as library inventory 460 (FIG. 4). In certain embodiments, the (N) storage construct names are stored in the library inventory. In certain embodiments, the library inventory includes a plurality of storage attribute fields. In certain embodiments, the (N) storage construct names of step 520 are assigned as storage management attributes for first logical volume. In certain embodiments, the library inventory includes four storage attribute fields, where those storage attribute fields include a storage class attribute field, a data class attribute field, a management class attribute field, and a storage group attribute field. In certain embodiments, step 560 includes assigning each of the (N) storage construct names of step 520 to a different one of the plurality of storage attribute fields associated with the logical volume.

Figure 6:
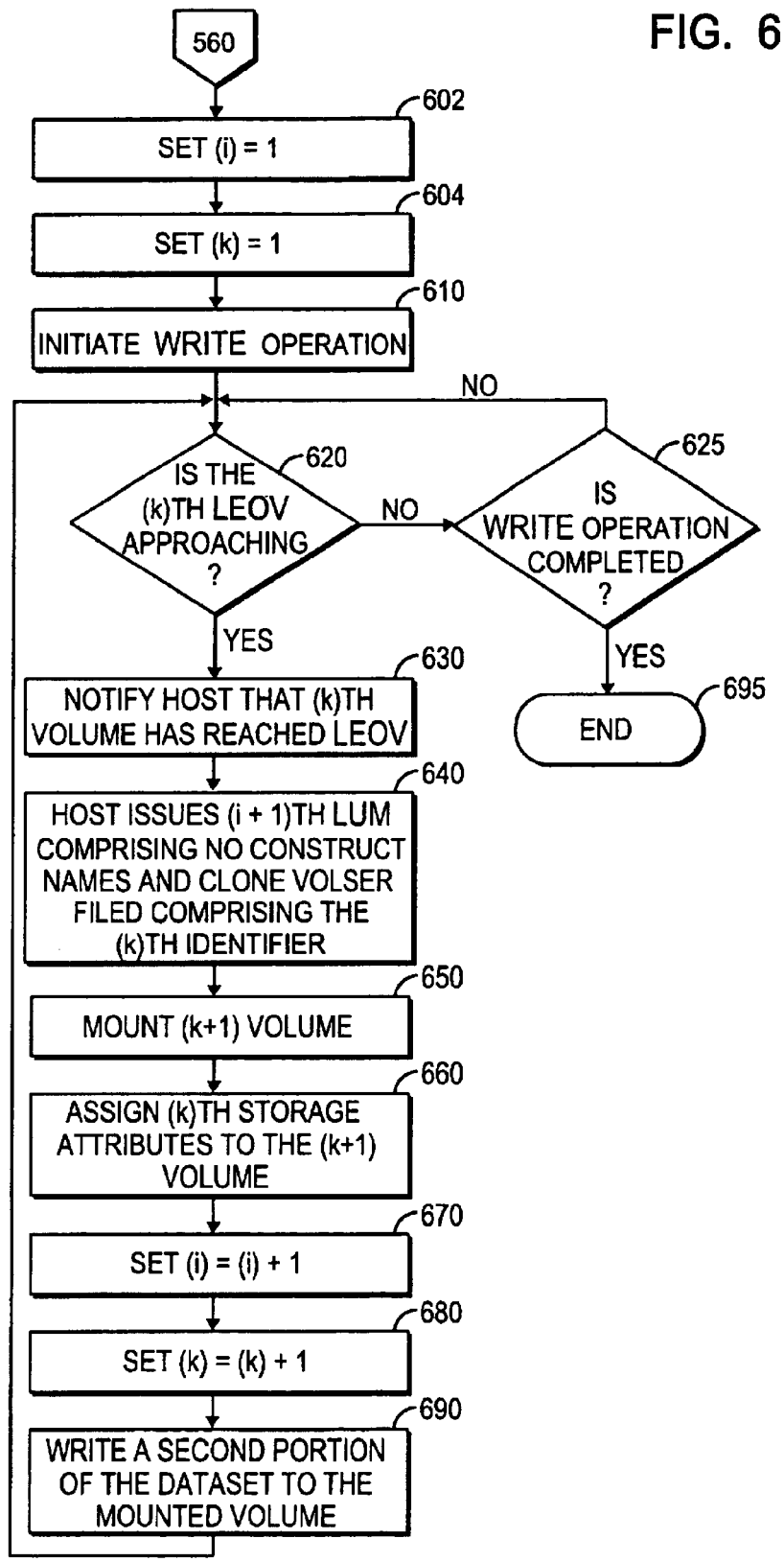
FIG. 6 is a flow chart summarizing additional steps in Applicants' method.

FIG. 6 summarizes additional steps in Applicants' method, wherein the storage attributes assigned to a first logical volume are subsequently assigned to additional logical volumes during two or more mounts to perform one or more WRITE operations. Referring now to FIG. 6, in steps 602 and 604 a first mount operation (i) is selected for a first logical volume (k). Thereafter, in step 610 in response to the first mount command of step 530 (FIG. 5) Applicants' method mounts the first logical volume of step 540 (FIG. 5) and begins to write a dataset, such as dataset 400 (FIG. 4), to the mounted logical volume using Applicants' virtual tape system.

In step 620, Applicants' method determines during the WRITE operation of step 610 if the logical end of volume of the (k)th logical volume, i.e. the (k)th LEOV, is approaching. In the first iteration of FIG. 6, Applicants' method determines if the LEOV of the first logical volume is approaching.

If Applicants' method determines in step 620 that the (k)th LEOV is not approaching, then Applicants' method continues the WRITE operation of step 610. Alternatively, if Applicants' method determines in step 620 that the (k)th LEOV is approaching, then Applicants' method transitions from step 620 to step 630 wherein Applicants' virtual tape system notifies the host that the (k)th LEOV is approaching. In the first iteration of FIG. 6, if Applicants' method determines in step 630 that the dataset cannot be written in its entirety to the first logical volume, then Applicants' method writes a first portion of the dataset to the first logical volume, and notifies the host in step 630 that the LEOV of the first logical volume is approaching.

In response to that notification, in step 640 the host computer issues the (i+1)th mount command, where that (i+1)th mount command includes no construct names. The clone volser field of that (i+1)th mount command, however, comprises the identifier assigned to the (k)th logical volume. In step 650, Applicant's method mounts the (k+1)th logical volume, and in step 660 assigns the (k)th storage attributes, i.e. the storage attributes assigned to the (k)th logical volume, to that (k+1)th logical volume. In certain embodiments, step 660 further includes reading the (k)th identifier from the clone volser field of the (i+1)th mount command, retrieving the (k)th storage attributes associated with that (k)th identifier, assigning the (k+1)th identifier to the (k+1)th logical volume, assigning the (k)th storage attributes as the (k+1)th storage attributes, and saving the (k+1)th identifier and the (k+1)th storage attributes.

For example, if Applicants' method issues a second mount command in step 640, Applicants' method mounts a second logical volume in step 650, and in step 660 assigns to that second logical volume the storage attributes assigned to the first logical volume. If the WRITE operation of step 610 cannot be completed using the second logical volume, then Applicants' method in step 640 issues a third mount command, in step 650 mounts a third logical volume, and in step 660 assigns to the third logical volume the storage attributes assigned to the second logical volume. In this example, the first logical volume, the second logical volume, and the third logical volume are each assigned the same storage attributes.

Referring again to FIG. 6, in steps 670 and 680 (i) and (k) are incremented. In step 690, Applicants' method continues the WRITE operation using the mounted volume. Applicants' method transitions from step 690 to step 620 wherein Applicants' method determines if the (k)th LEOV is approaching, i.e. determines if the remaining portion of the dataset can be written in its entirety to the mounted logical medium. If Applicants' method determines in step 620 that the (k)th LEOV is approaching, then Applicants' method transitions to step 630 and continues as described above.

Alternatively, if Applicants' method determines in step 620 that the (k)th LEOV is not approaching, then Applicants' method transitions from step 620 to step 625 wherein Applicants' method determines if the WRITE operation is completed. If Applicants' method determines in step 625 that the WRITE operation is not completed, then Applicants' method loops between steps 620 and 625 to monitor the progress of that WRITE operation. Alternatively, if Applicants' method determines in step 625 that the WRITE operation is completed, then Applicants' method transitions from step 625 to step 695 and ends.

If, after demount of the (k)th logical volume, Applicants' method writes a subsequent dataset, i.e. the (n)th dataset, to that (k)th logical volume, Applicants' method first issues a mount command for that (k)th logical volume, where that mount command includes no construct names and an empty clone volser field. Applicants' method then transitions to step 610 and begins writing that (n)th dataset to the mounted (k)th logical volume.

In certain embodiments, the individual steps recited in FIGS. 5 and/or 6 may be combined, eliminated, or reordered. Applicants' invention includes an article of manufacture comprising a computer useable medium having computer readable program code disposed therein to maintain information by assigning one or more storage attributes to each of a plurality of logical volumes. Applicants' invention further includes computer program products embodied as program code stored in one or more memory devices, such as a magnetic disk, a magnetic tape, or other non-volatile memory device, to maintain information by assigning one or more storage attributes to each of a plurality of logical volumes.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to maintain information by assigning one or more storage attributes to each of a plurality of logical volumes, comprising the steps of:

forming a first dataset;

assigning one or more storage attributes to said first logical volume;

selecting one or more storage construct names for said first dataset;

issuing a first mount command, wherein said first mount command comprises said one or more storage construct names and an empty clone volser field;

writing a first portion of said first dataset to a first logical volume;

saving each of said one or more storage construct names as a different one of said one or more storage attributes;

assigning a first identifier to said first logical volume;

determining if an LEOV (logical End of Volume) is approaching;

operative if the LEOV of said first logical volume is approaching, issuing a second mount command, wherein said second mount command includes a clone volser field comprising said first identifier, and wherein said second mount command does not comprise said one or more storage construct names;

mounting a second logical volume;

writing a second portion of said first dataset to a second logical volume; and assigning said one or more storage attributes to said second logical volume.

2. The method of claim 1, further comprising the steps of:

saving said one or more storage attributes as first storage attributes;

associating said first storage attributes with said first identifier;

saving said first identifier;

reading said first identifier from the clone volser field of said second mount command;

retrieving said first storage attributes;

assigning a second identifier to said second logical volume;

assigning said first storage attributes as second storage attributes;

associating said second storage attributes with said second identifier;

saving said second identifier and said second storage attributes.

3. The method of claim 1, further comprising the steps of:

providing a host computer, wherein said host computer forms said first dataset, issues said first mount command, and issues said second mount command;

providing a virtual tape system in communication with said host computer, wherein said virtual tape system writes said first portion of said first dataset to said first logical volume;

notifying said host computer by said virtual tape system that said LEOV of said first logical volume is approaching.

4. The method of claim 3, wherein said virtual tape system comprises a library inventory, further comprising the steps of:

communicating said first dataset and said one or more storage construct names from said host computer to said virtual tape system;

storing said first identifier and said one or more storage attributes in said library inventory.

5. The method of claim 4, further comprising the step of providing four storage attribute fields in said library inventory;

wherein said four storage attribute fields comprise a storage class attribute field, a data class attribute field, a management class attribute field, and a storage group attribute field.

6. The method of claim 1, further comprising the steps of:

operative if said LEOV of said first logical volume is not reached, writing said first dataset to said first logical volume;

demounting said first logical volume;

forming the (n)th dataset, wherein (n) is greater than or equal to 2;

issuing the (i)th mount command, wherein said (i)th mount command specifies said first logical volume and includes no storage construct names and an empty clone volser field, wherein (i) is greater than or equal to 2;

mounting said first logical volume;

writing a first portion of said (n)th dataset to said first logical volume;

determining if the LEOV of said first logical volume is reached.

7. The method of claim 6, further comprising the steps of:

operative if said LEOV of said first logical volume is reached, issuing the (n+1)th mount command, wherein said (n+1)th mount command includes no storage construct names and a clone volser field comprising said first identifier;

mounting a second logical volume;

assigning said one or more storage attributes to said second logical volume; and writing a second portion of said (n)th dataset to said second logical volume.

8. The method of claim 6, wherein the LEOV of said first logical volume is not reached, further comprising the step of writing said (n)th dataset to said first logical volume.

9. A method to maintain information by assigning one or more storage attributes to each of a plurality of logical volumes, comprising the steps of:

providing a host computer;

providing a virtual tape system capable of communicating with said host computer, wherein said virtual tape system comprises a library inventory;

forming by said host computer a first dataset;

selecting by said host computer (N) storage construct names for said first dataset, wherein (N) is greater than or equal to 1 and less than or equal to 4;

issuing by said host computer a first mount command, wherein said first mount command comprises said (N) storage construct names and an empty clone volser field;

mounting a first logical volume, wherein said first logical volume comprises an LEOV;

assigning an identifier to said first logical volume;

storing said identifier and said (N) construct names in said library inventory;

writing a first portion of said first dataset to said first logical volume;

determining if said LEOV is approaching;

notifying said host computer that said LEOV is approaching;

issuing a second mount command by said host computer, wherein said second mount command includes no storage construct names and a clone volser field comprising said identifier;

mounting a second logical volume;

assigning said one or more storage attributes to said second logical volume;

writing the remainder of said first dataset to said second logical volume;

demounting said second logical volume;

forming by said host computer the (n)th dataset, wherein (n) is greater than or equal to 2;

issuing by said host the (i)th mount command, wherein said (i)th mount command specifies said second logical volume and wherein (i) is greater than or equal to 3, and wherein said (i)th mount command comprises no storage construct names and an empty clone volser field;

mounting said second logical volume; and writing said part or all of said (n)th dataset to said second logical volume.

10. An article of manufacture comprising a computer useable medium having computer readable program code disposed therein to maintain information by assigning one or more storage attributes to each of a plurality of logical volumes, the computer readable program code comprising a series of computer readable program steps to effect:

receiving from a host computer a first dataset;

assigning one or more storage attributes to a first logical volume;

receiving a first mount command, wherein said first mount command comprises one or more storage construct names and an empty clone volser field;

writing a first portion of said first dataset to said first logical volume comprising an LEOV;

saving each of said one or more storage construct names as a different one of said one or more storage attributes;

assigning an first identifier to said first logical volume;

determining if said LEOV is approaching;

operative if the LEOV of said first logical volume is approaching, receiving a second mount command, wherein said second mount command includes a clone volser field comprising said first identifier, and wherein said second mount command does not comprise said one or more storage construct names;

mounting a second logical volume;

writing a second portion of said first dataset to said second logical volume; and assigning said one or more storage attributes to said second logical volume.

11. The article of manufacture of claim 10, said computer readable program code further comprising a series of computer readable program steps to effect:

saving said one or more storage attributes as first storage attributes;

associating said first storage attributes with said first identifier;

saving said first identifier;

reading said first identifier from the clone volser field of said second mount command;

retrieving said first storage attributes;

assigning a second identifier to said second logical volume;

assigning said first storage attributes as second storage attributes;

associating said second storage attributes with said second identifier;

saving said second identifier and said second storage attributes.

12. The article of manufacture of claim 10, said computer readable program code further comprising a series of computer readable program steps to effect:

receiving said first dataset, said first mount command, and said second mount command from a host computer;

notifying said host computer that said LEOV of said first logical volume is approaching.

13. The article of manufacture of claim 12, further comprising a library inventory, said computer readable program code further comprising a series of computer readable program steps to effect storing said first identifier and said one or more storage attributes in said library inventory.

14. The article of manufacture of claim 13, wherein said library inventory includes a storage class attribute field, a data class attribute field, a management class attribute field, and a storage group attribute field.

15. The article of manufacture of claim 10, said computer readable program code further comprising a series of computer readable program steps to effect:

operative if said LEOV of said first logical volume is not reached, writing said first dataset to said first logical volume;

demounting said first logical volume;

receiving a second dataset;

receiving a second mount command for said first logical volume, wherein said second mount command includes no storage construct names and an empty clone volser field;

mounting said first logical volume;

writing a first portion of said second dataset to said first logical volume;

determining if the LEOV of said first logical volume is reached.

16. The article of manufacture of claim 15, said computer readable program code further comprising a series of computer readable program steps to effect:

operative if said LEOV of said first logical volume is reached, receiving a third mount command, wherein said third mount command includes no storage construct names and a clone volser field comprising said first identifier;

mounting a second logical volume;

assigning said one or more storage attributes to said second logical volume; and writing a second portion of said second dataset to said second logical volume.

17. The article of manufacture of claim 15, wherein the LEOV of said first logical volume is not reached, said computer readable program code further comprising a series of computer readable program steps to effect writing said second dataset to said first logical volume.

18. An article of manufacture comprising a computer useable medium having computer readable program code disposed therein to maintain information by assigning one or more storage attributes to each of a plurality of logical volumes, said article of manufacture further comprising a library inventory, the computer readable program code comprising a series of computer readable program steps to effect:

receiving from a host computer a first mount command, wherein said first mount command comprises one or more storage construct names and an empty clone volser field;

mounting a first logical volume, wherein said first logical volume comprises an LEOV;

assigning an identifier to said first logical volume;

storing said identifier and said one or more storage construct names in said library inventory;

writing a first portion of said first dataset to said first logical volume;

determining if said LEOV is approaching;

notifying said host computer that said LEOV is approaching;

receiving a second mount command, wherein said second mount command includes no storage construct names and a clone volser field comprising said identifier;

mounting a second logical volume;

assigning said one or more storage attributes to said second logical volume;

writing the remainder of said first dataset to said second logical volume;

demounting said second logical volume;

forming by said host computer the (n)th dataset, wherein (n) is greater than or equal to 2;

issuing by said host computer the (i)th mount command, wherein (i) is greater than or equal to 3, and wherein said (i)th mount command specifies said second logical volume and comprises no storage construct names and an empty clone volser field;

mounting said second logical volume; and writing said part or all of said (n)th dataset to said second logical volume.

19. A computer program product usable with a programmable computer processor having computer readable program code embodied therein to maintain information by assigning one or more storage attributes to each of a plurality of logical volumes, comprising:

computer readable program code which causes said programmable computer processor to receive from a host computer a first dataset;

computer readable program code which causes said programmable computer processor to assign one or more storage attributes to a first local volume comprising an LEOV;

computer readable program code which causes said programmable computer processor to receive a first mount command, wherein said first mount command comprises one or more storage construct names and an empty clone volser field;

computer readable program code which causes said programmable computer processor to write a first portion of said first dataset to said first logical volume;

computer readable program code which causes said programmable computer processor to save each of said one or more storage construct names as a different one of said one or more storage attributes;

computer readable program code which causes said programmable computer processor to assign a first identifier to said first logical volume;

computer readable program code which causes said programmable computer processor to determine if said LEOV is approaching;

computer readable program code which, if the LEOV of said first logical volume is approaching, causes said programmable computer processor to receive a second mount command, wherein said second mount command includes a clone volser field comprising said first identifier, and wherein said second mount command does not comprise said one or more storage construct names;

computer readable program code which causes said programmable computer processor to mount a second logical volume;

computer readable program code which causes said programmable computer processor to write a second portion of said first dataset to said second logical volume;

computer readable program code which causes said programmable computer processor to assign said one or more storage attributes to said second logical volume.

20. The computer program product of claim 19, further comprising:

computer readable program code which causes said programmable computer processor to save said one or more storage attributes as first storage attributes;

computer readable program code which causes said programmable computer processor to associate said first storage attributes with said first identifier;

computer readable program code which causes said programmable computer processor to save said first identifier;

computer readable program code which causes said programmable computer processor to read said first identifier from the clone volser field of said second mount command;

computer readable program code which causes said programmable computer processor to retrieve said first storage attributes;

computer readable program code which causes said programmable computer processor to assign a second identifier to said second logical volume;

computer readable program code which causes said programmable computer processor to assign said first storage attributes as second storage attributes;

computer readable program code which causes said programmable computer processor to associate said second storage attributes with said second identifier;

computer readable program code which causes said programmable computer processor to save said second identifier and said second storage attributes.

21. The computer program product of claim 19, further comprising:

computer readable program code which causes said programmable computer processor to receive said first dataset, said first mount command, and said second mount command from a host computer;

computer readable program code which causes said programmable computer processor to notify said host computer that said LEOV of said first logical volume is approaching.

22. The computer program product of claim 21, further comprising computer readable program code which causes said programmable computer processor to store said first identifier and said one or more storage attributes in a library inventory.

23. The computer program product of claim 22, wherein said library inventory includes a storage class attribute field, a data class attribute field, a management class attribute field, and a storage group attribute field.

24. The computer program product of claim 19, further comprising:

computer readable program code which, if said LEOV of said first logical volume is not approaching, causes said programmable computer processor to write said first dataset to said first logical volume;

computer readable program code which causes said programmable computer processor to demount said first logical volume;

computer readable program code which causes said programmable computer processor to receive a second dataset;

computer readable program code which causes said programmable computer processor to receive a second mount command for said first logical volume, wherein said second mount command includes no storage construct names and an empty clone volser field;

computer readable program code which causes said programmable computer processor to mount said first logical volume;

computer readable program code which causes said programmable computer processor to write a first portion of said second dataset to said first logical volume;

computer readable program code which causes said programmable computer processor to determine if the LEOV of said first logical volume is approaching.

25. The computer program product of claim 24, further comprising:

computer readable program code which, if said LEOV of said first logical volume is approaching, causes said programmable computer processor to receive a third mount command, wherein said third mount command includes no storage construct names and a clone volser field comprising said first identifier;

computer readable program code which causes said programmable computer processor to mount a second logical volume;

computer readable program code which causes said programmable computer processor to assign said one or more storage attributes to said second logical volume; and computer readable program code which causes said programmable computer processor to write a second portion of said second dataset to said second logical volume.

26. The computer program product of claim 24, wherein the LEOV of said first logical volume is not approaching, further comprising computer readable program code which causes said programmable computer processor to write said second dataset to said first logical volume.

27. A computer program product usable with a programmable computer processor having computer readable program code embodied therein to maintain information by assigning one or more storage attributes to each of a plurality of logical volumes, comprising:

computer readable program code which causes said programmable computer processor to receive from a host computer a first mount command, wherein said first mount command comprises one or more storage construct names and an empty clone volser field;

computer readable program code which causes said programmable computer processor to mount a first logical volume, wherein said first logical volume comprises an LEOV;

computer readable program code which causes said programmable computer processor to assign an identifier to said first logical volume;

computer readable program code which causes said programmable computer processor to store said identifier and said one or more storage construct names in said library inventory;

computer readable program code which causes said programmable computer processor to write a first portion of said first dataset to said first logical volume;

computer readable program code which causes said programmable computer processor to determine if said LEOV is approaching;

computer readable program code which, if said LEOV is approaching, causes said programmable computer processor to notify said host computer that said LEOV is approaching;

computer readable program code which causes said programmable computer processor to receive a second mount command, wherein said second mount command includes no storage construct names and a clone volser field comprising said identifier;

computer readable program code which causes said programmable computer processor to mount a second logical volume;

computer readable program code which causes said programmable computer processor to assign said one or more storage attributes to said second logical volume;

computer readable program code which causes said programmable computer processor to write the remainder of said first dataset to said second logical volume;

computer readable program code which causes said programmable computer processor to demount said second logical volume;

computer readable program code which causes said programmable computer processor to receive from said host computer the (n)th dataset, wherein (n) is greater than or equal to 2;

computer readable program code which causes said programmable computer processor to receive from said host the (i)th mount command specifying said second logical volume, wherein (i) is greater than or equal to 3, and wherein said (i)th mount command comprises no storage construct names and an empty clone volser field;

computer readable program code which causes said programmable computer processor to mount said second logical volume; and computer readable program code which causes said programmable computer processor to write all of part of said (n)th dataset to said second logical volume.

* * * * *